United States Patent [19]
Paton et al.

[11] 3,849,588
[45] Nov. 19, 1974

[54] METHOD OF ELECTROSLAG MELTING OF METAL INGOTS

[76] Inventors: Boris Evgenievich Paton, ulitsa Kotsjubinskogo, 9, kv. 21; Boris Izrailevich Medovar, ulitsa A. Barbjusa, 22/26, kv. 109; Ilya Iosifovich Kumysh, Vozdukhoflotsky prospekt, 42, kv. 51; Anatoly Konstantinovich Tsykulenko, ulitsa Babushking, 23, kv. 38; Jury Fedorovich Alferov, bulvar Lepse, 29, kv. 64; Grigory Bentsionovich Schupak, ulitsa Chudnovskogo, 7, kv. 61; Oleg Petrovich Bondarenko, ulitsa Kreschatik, 15, kv. 36; Alexei Georgievich Bogachenko, ulitsa Miljutenko, 15/2, kv. 141, all of Kiev, U.S.S.R.

[22] Filed: Sept. 24, 1973

[21] Appl. No.: 399,803

[30] Foreign Application Priority Data
Feb. 2, 1973 U.S.S.R............................ 1907050

[52] U.S. Cl.................................. 13/34, 13/12
[51] Int. Cl................................. H05b 3/60
[58] Field of Search........................ 13/9 ES, 12, 34

[56] References Cited
UNITED STATES PATENTS
3,619,464   11/1971   Holzgruber et al. ............... 13/9 ES
3,652,773   3/1972    Holzgruber et al. ............... 13/9 ES

*Primary Examiner*—R. N. Envall, Jr.
*Attorney, Agent, or Firm*—Holman & Stern

[57] ABSTRACT

A method of electroslag melting of a metal ingot by remelting at least two consumable electrodes or two groups of such electrodes powered from individual power sources. The method includes alternately and repeatedly varying current and voltage across each consumable electrode or each group of the consumable electrodes in the course of ingot buildup. The method ensures the melting of heavy ingots featuring higher quality (improved structure resulting from a reduction in both the depth and volume of metal pool).

12 Claims, 7 Drawing Figures

METHOD OF ELECTROSLAG MELTING OF METAL INGOTS

BACKGROUND OF THE INVENTION

The present invention relates to methods of electroslag melting of metal ingots usable in electrometallurgy for melting heavy ingots.

Known in the art is a method of electroslag melting of a metal ingot from at least two consumable electrodes or two groups of such electrodes, each of them being connected to an individual power source. The method includes providing molten slag by establishing a slag bath in a cooled mould, simultaneously supplying electric energy to each of the consumable electrodes or to a group of such electrodes with their lower ends dipped into the slag bath, and building-up the metal ingot. In this case, same currents and voltages are supplied to each consumable electrode or to each group of such electrodes in the course of melting of the metal ingot.

However, simultaneous intense melting of all the consumable electrodes and particularly those in the middle portion of a row results in the formation in the mould of a metal pool of a considerable volume with a deepening in the central portion of the pool bottom. Thus, in melting heavy steel ingots ranging in weight from 15 to 60 $t$, metal pools from 2 $t$ upwards in weight can be obtained. A large volume of the deepened metal pool affects adversely ingot quality, insofar as it is conducive to the development of liquational processes, axial porosity and lower mechanical characteristics of the metal of the ingot produced by the electroslag remelting of the consumable electrodes.

SUMMARY OF THE INVENTION

The main object of the present invention is to provide a method of electroslag melting of metal ingots which will ensure an improvement in the structure of the ingot being melted due to a reduction in the volume of a metal pool and to favorable crystal orientation.

Another no less important object of the invention is to perform the electroslag process at lower power input.

Still another object of the invention is to bring about an effect ensuring reciprocation of a heat center along the wide side of the mould according to a given dependence.

These and other objects of the invention are achieved by providing a method of electroslag melting of a metal ingot from at least two consumable electrodes or two groups of such electrodes, each of them being connected to an individual power source. The method includes providing molten slag by establishing a slag bath in a cooled mould, simultaneously supplying electric energy to each of the consumable electrodes or to each group of such electrodes with their lower ends dipped into the slag bath, and building-up the metal ingot. According to the invention, the current and voltage supplied to each consumable electrode or to each group of such electrodes are alternately and repeatedly varied in the course of building-up of the metal ingot.

The above method ensures improved structure of the ingot resulting from a reduction in the volume of the metal pool and favorable crystal orientation.

It is expedient that the magnitudes of the current and voltage applied to the consumable electrodes be varied in succession from the first to the last electrode.

This provides a recurrent progressive motion of a heat center along the slag bath.

It is desirable that the current magnitude and voltage across the consumable electrodes be changed from the first to the last electrode and then from the last to the first one, whereupon the above cycle is reiterated over and over again, with the heat center reciprocating in that case along the slag bath.

It would be sound practice for the minimum values of the current and voltage across the consumable electrodes to be equal to about 10–30 percent of their maximum values.

In this case the electroslag process will be performed under steady-state conditions with a sufficiently large amplitude of variations between the maximum and minimum currents and voltages.

It is also possible to simultaneously increase the current and voltage across one of the adjacent electrodes and reduce them across the other one. The above method provides formation of a flat-bottomed metal pool with the spacing between the two adjacent electrodes being smaller or equal to the thickness of a single electrode.

It is desirable that the maximum time period over which the minimum current and voltage are applied to the consumable electrodes continue until the temperature of the slag bath around the above electrodes exceeds the slag melting point by 50°C. This will ensure high quality ingots through the presence of a common slag bath.

It is also expedient that the maximum current and voltage be supplied to each consumable electrode over the same time period. This will ensure regular advance of the heat center along the slag bath.

It is desirable that the consumable electrodes arranged in the middle portion of a row and spaced apart at a distance smaller than their thickness be fed with the maximum current and voltage over a time period amounting to 10–50 percent of the interval within which the extreme consumable electrodes of the row are supplied with the maximum current and voltage. This will ensure formation of the flat-bottomed metal pool.

The consumable electrodes positioned in the middle portion of the row and spaced apart at a distance smaller than their thickness can be supplied with the maximum current and voltage of such a magnitude that their power will amount to 50–80 percent of that released by the extreme consumable electrodes of the row at the maximum voltage and current, a feature ensuring the formation of the flat-bottomed pool.

If the distance between the adjacent consumable electrodes exceeds the thickness of a single consumable electrode, it is expedient that the maximum current and voltage be applied to each next consumable electrode within an interval amounting to 50–90 percent of the time period over which the maximum current and voltage have been supplied to the preceding consumable electrode. This provides also for the formation of a flat-bottomed metal pool.

The maximum current and voltage across certain consumable electrodes can be held at a value exceeding by 30–80 percent those maintained across the other electrodes with the above electrodes alternating with each other. This results in the formation of a metal pool with a wavy-like bottom providing the production of ingot metal with disoriented crystals.

The invention is further exemplified by a detailed description of exemplary embodiments of the method, taken in conjunction with the accompanying drawings, wherein.

Figure 7:
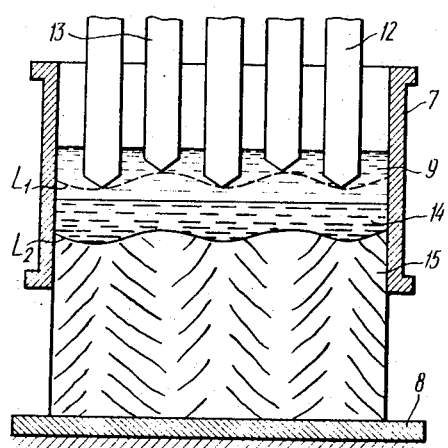
Figure 4:
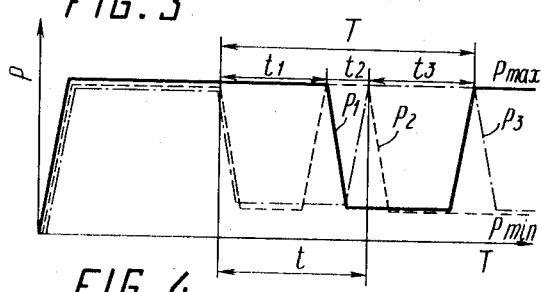
Figure 5:
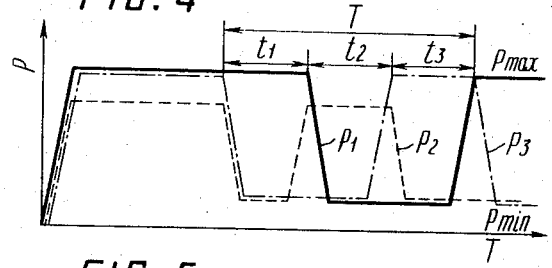
Figure 6:
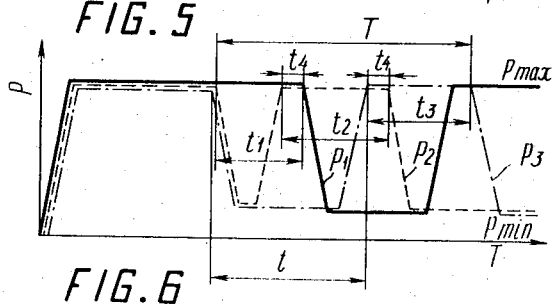

FIG. 4 is a graph showing variations of power of the consumable electrodes with time when operating with three electrodes or three groups of the electrodes with the consumable electrodes arranged in the middle portion of a row being supplied with maximum current and voltage over a time period amounting to 10–50 percent of that throughout which the maximum current and voltage are applied to the extreme consumable electrodes of the row;

FIG. 5 is a graph showing variations of power of the consumable electrodes with time when operating with three electrodes or three groups of the electrodes with the consumable electrodes located in the middle portion of row being supplied with maximum current and voltage of such a magnitude that their power will amount to 50–80 percent of that released by the extreme consumable electrodes of the row at the maximum current and voltage values;

FIG. 6 is a graph showing variations of power of the consumable electrodes with time when operating with three electrodes or three groups of the electrodes with each next electrode being supplied with maximum current and voltage within an interval amounting to 50–90 percent of the time period over which the maximum current and voltage have been applied to the preceding consumable electrode and FIG. 7 depicts the mould with the consumable electrodes and melted metal ingot with disoriented crystalline structure.

Notation on the graphs:

$t_1, t_2, t_3$ — time periods over which the electrodes or their groups operate at maximum current and voltage values;

$t$ — time period over which the electrode operates at minimum current and voltage values;

$T$ — operational cycle time;

$t_4$ — time lag when cutting off the preceding electrode;

$P_1, P_2, P_3$ — power delivered by the consumable electrodes or their groups;

$L_1$ — envelope skirting the ends of the consumable electrodes;

$L_2$ — curve showing the shape of the bottom of a metal pool

DETAILED DESCRIPTION OF PREFERRED EMBODIMENTS

The method of electroslag melting of metal ingots is performed as follows.

EXAMPLE 1

Figure 1:
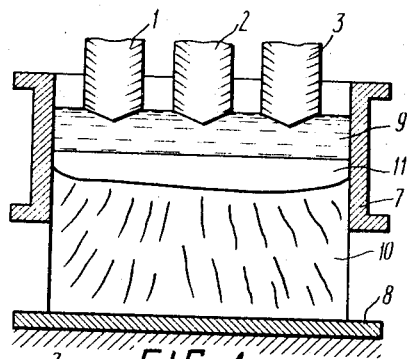
FIG. 1 shows a mould with consumable electrodes, a metal ingot being melted and a flat-bottomed metal pool.
Figure 2:
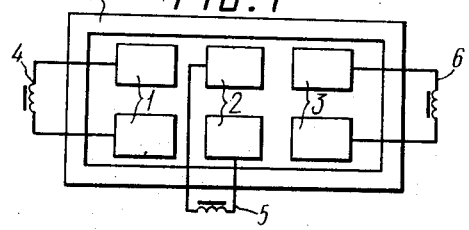
FIG. 2 is a circuit diagram of groups of consumable electrodes coupled to individual power sources.

At least two consumable electrodes are employed. In this example use is made of three groups of consumable electrodes 1, 2 and 3 (FIGS. 1 and 2). Each group made up of two consumable electrodes is connected to individual power sources 4, 5 and 6. For melting an ingot, a cooled mould 7 of any desired shape can be employed with the mould being mounted on a base plate 8. Where the mould 7 of rectangular cross-section is utilized, the consumable electrodes 1 through 3 are arranged in a row along the wide side of the cooled mould 7. Slag bath 9 is established in the cooled mould 7 by either pouring molten slag or charging solid flux to be further melted. An electric current is passed to all the electrodes 1 through 3 whose lower ends are dipped into the slag bath 9. Due to liberation of heat in the slag bath 9, the consumable electrodes 1–3 will melt off with a metal ingot 10 being produced from the electrode molten metal. In the upper portion of the ingot 10 a metal pool 11 is maintained during the melting process. Melting conditions (current magnitude, voltage and electrode feed rate) are chosen depending on the dimensions of the ingot 10 to be melted.

After steady-state melting conditions have been attained, the current and voltage values are varied according to the invention, i.e., the current and voltage across each consumable electrode or each group of the consumable electrodes, as described in our Example, are alternately reduced and raised, the cycle being reiterated in the course of melting. The current and voltage variations can be initiated by either first reducing or raising their values.

Figure 3:
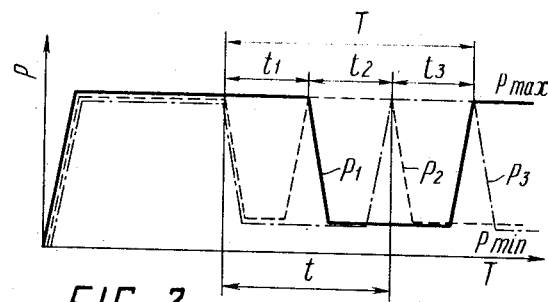
FIG. 3 is a graph showing variations of power of the consumable electrodes with time when operating with three electrodes or three groups of the electrodes with maximum current and voltage being supplied to each consumable electrode throughout the same time period.

In case the cycle is initiated by reducing the current and voltage magnitudes, upon proceeding to the second and third groups of the electrodes (or likewise to the second and third electrodes, if separate, not grouped electrodes are employed) the current and voltage magnitudes are reduced to a value amounting to 10–30 percent of those applied to the first group of the electrodes. In this case the power released by the above groups of the electrodes (FIG. 3) will have a minimum value ($P_{min}$) and that delivered by the first group will have a maximum one ($P_{max}$).

The temperature of the slag bath around the consumable electrodes fed with the reduced current and voltage will drop. The time period ($t$) over which the groups of the consumable electrodes will operate at the reduced current and voltage values is assigned on the assumption that the temperature of a slag bath section near the electrodes should drop to that in excess of the slag melting point by 50°C. As soon as half of that time period ($t_1$) elapses, the current and voltage across the first group of the electrodes are reduced to those set up for the second and third groups of the consumable electrodes. At the same time the current and voltage across the second group of the electrodes are raised to those set up earlier for the first group of the consumable electrodes. On completion of the above time period the current and voltage across the second group of the consumable electrodes are reduced and those applied to the third group raised, whereupon the above cycle is reiterated ensuring a recurrent progressive motion of a heat center along the slag bath from the first to the third group of the consumable electrodes in one and the same direction. In this case to ensure regular advance of the heat center the maximum current and voltage are applied to each group of the consumable electrodes over the same time period ($t_1=t_2=t_3$).

EXAMPLE 2

The current and voltage magnitudes are varied from the first to the third group of the consumable electrodes, as described in Example 1. Then the current and voltage are changed in a reverse order, i.e., from the last (third) to the first group of the consumable electrodes whereupon the cycle described hereinbefore is reiterated over and over again. This ensures reciprocation of the heat center along the slag bath.

EXAMPLE 3

In order to create conditions favoring axial crystallization of the ingot metal, the metal pool should have a flat bottom. According to the invention, if the distance between the consumable electrodes or their groups is smaller than the thickness of a single electrode, the above shape of the metal pool can be provided in two cases.

In order to enable the formation of the flat-bottomed metal pool (according to the first version) as soon as steady-state melting conditions are attained, the current and voltage across the second and third groups of the consumable electrodes are reduced, as described in Example 1 to values amounting to 10-30 percent of those across the first group of the electrodes. Similarly to Example 1, the time period ($t$) over which the groups of the consumable electrodes operate at reduced current and voltage values (FIG. 4) is equal to a time interval throughout which a slag bath section around the electrodes cools down to a temperature exceeding by 50°C the slag melting point. However, an interval ($t_1$) within which the maximum current and voltage are applied to the second (middle) group of the consumable electrodes is increased so that the remaining time ($t_2$) of said time period over which the second (middle) group of the consumable electrodes operates at the maximum current and voltage values would amount to 10-50 percent of that over which the first and third (extreme) groups of the consumable electrodes are supplied with the maximum current and voltage. In this case, the same maximum power values are obtained for all three groups of the electrodes.

In order to provide for the formation of a flat-bottomed metal pool (according to the second version), the time period over which each group of the consumable electrodes operates at maximum current and voltage is assigned similarly to Example 1. In this case, the magnitudes of the maximum current and voltage supplied to the second (middle) group of the consumable electrodes are reduced with the electrode power amounting to 50-80 percent of that released by the first and third (extreme) groups of the row obtainable at the maximum current and voltage values. In that case $P_2<P_1=P_3$ (FIG. 5).

Both in the first and the second case, in applying the maximum current and voltage to the consumable electrodes either recurrent-progressive, as in Example 1, or reciprocating, as in Example 2, a pattern must be followed with the current and voltage being raised concurrently across one group of the consumable electrodes and reduced across another.

EXAMPLE 4

In case the spacing between the consumable electrodes or their groups exceeds the thickness of a single consumable electrode, a flat-bottomed metal pool can be provided in the following manner. As soon as steady-state melting conditions are achieved, the current and voltage across the second and third groups of the consumable electrodes are reduced, as described in Example 1. However, an interval within which the maximum current and voltage are fed to the second (middle) group of the consumable electrodes is reduced so that the first (preceding group of the consumable electrodes will operate at the maximum current and voltage values throughout a time period amounting to 50-90 percent of the interval. In this case when the second group of the consumable electrodes is supplied with the maximum current and voltage, those applied to the first group are not reduced with the group operating during the remaining 10-50 percent of the interval ($t_4=(0.1-0.5)t_1$) (FIG. 6) under maximum conditions. Likewise, the third group of the consumable electrodes is also supplied with the maximum current and voltage.

EXAMPLE 5

After steady-state melting conditions have been attained, the current and voltage magnitudes are varied, as described in Example 1, with the only difference that the magnitudes of the maximum current and voltage across consumable electrodes 12 (FIG. 7) exceeds by 30-80 percent those across electrodes 13 with the consumable electrodes 12 and 13 alternating with each other. In this case the consumable electrodes are dipped into the slag bath to different depths, and envelope $L_1$ of the electrode ends immersed into the slag is similar to curve $L_2$ representing the shape of the bottom of a molten pool 14.

As a result, the crystals of the ingot metal are disoriented which affects favorably mechanical characteristics of the metal.

What we claim is:

1. A method of electroslag melting of a metal ingot in a cooled mould from at least two consumable electrodes with each electrode being connected to an individual power source comprising the steps of: providing molten slag by establishing a slag bath in the mould; simultaneously supplying electric energy to each of the consumable electrodes having their lower ends dipped into the slag bath; forming the metal ingot in the mould in the course of melting the consumable electrodes; and alternately and repeatedly varying the current and voltage applied to each of the consumable electrodes.

2. A method of electroslag melting of a metal ingot in a cooled mould from at least two groups of consumable electrodes with each group of electrodes being connected to an individual power source comprising the steps of: providing molten slag by establishing a slag bath in the mould; simultaneously supplying electric energy to each group of the consumable electrodes having their lower ends dipped into the slag bath; forming the metal ingot in the mould in the course of melting said at least two groups of the electrodes; and alternately and repeatedly varying the current and voltage applied to each of said groups of the consumable electrodes.

3. The method of claim 1, wherein the step of varying the current and voltage comprises successively varying the magnitudes of current and voltage applied to said consumable electrodes from a first to a last electrode.

4. The method of claim 1, wherein the step of varying the current and voltage comprises varying the magnitudes of current and voltage across said consumable electrodes from a first to a last electrode and then from the last to the first one and repeating this cycle over and over again.

5. The method of claim 1, further comprising maintaining minimum current and voltage values amounting to 10–30 percent of maximum values of current and voltage across said consumable electrodes.

6. The method of claim 1, wherein the step of varying the current and voltage comprises raising the current and voltage across one of adjacent electrodes and simultaneously reducing those across the other one.

7. The method of claim 1, further comprising supplying minimum current and voltage to the consumable electrodes over a maximum time period until the temperature of the slag bath around the electrodes exceeds the slag melting point by 50°C.

8. The method of claim 1, further comprising supplying each of said consumable electrodes with maximum current and voltage over a same time interval.

9. The method of claim 1, further comprising supplying said consumable electrodes positioned in the middle portion of a row and spaced apart at a distance which is smaller than the thickness of a single electrode with maximum current and voltage over a period of time amounting to 10–50 percent of an interval within which maximum current and voltage are supplied to the consumable electrodes at the ends of the row.

10. The method of claim 1, further comprising maintaining maximum current and voltage values across consumable electrodes arranged in the middle portion of a row and spaced apart at a distance which is smaller than the thickness of a single electrode so that their power amounts to 50–80 percent of that released by the electrodes at the ends of the row at maximum current and voltage values.

11. The method of claim 1, further comprising supplying maximum current and voltage to each next consumable electrode after an interval amounting to 50–90 percent of a time period over which maximum current and voltage have been conducted to a preceding electrode when the distance between adjacent consumable electrodes exceeds the thickness of a single consumable electrode.

12. The method of claim 1, further comprising maintaining the magnitudes of maximum current and voltage across certain electrodes that exceed those across other electrodes by 30–80 percent with the electrodes alternating with each other.

* * * * *